United States Patent
Slocum et al.

(10) Patent No.: US 7,072,033 B2
(45) Date of Patent: *Jul. 4, 2006

(54) MONITOR CALIBRATOR

(75) Inventors: David Slocum, Yardley, PA (US); Cormic K. Merle, Rochester, NY (US)

(73) Assignee: Datacolor Holding AG, Lawrenceville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/004,197

(22) Filed: Dec. 3, 2004

(65) Prior Publication Data

US 2005/0078305 A1     Apr. 14, 2005

Related U.S. Application Data

(63) Continuation of application No. 10/023,621, filed on Dec. 18, 2001.

(60) Provisional application No. 60/256,552, filed on Dec. 18, 2000.

(51) Int. Cl.
  *G01J 1/42*     (2006.01)
  *G01J 3/46*     (2006.01)

(52) U.S. Cl. .................. 356/220; 356/402; 356/405; 356/419; 250/226

(58) Field of Classification Search ........... 356/402, 356/405–407, 416, 419, 218, 219, 220; 250/226, 250/239; 348/184, 191, 180, 181, 189, 190; 248/177.1, 165, 415, 425

See application file for complete search history.

(56) References Cited

U.S. PATENT DOCUMENTS

| | | | | |
|---|---|---|---|---|
| 4,562,983 A | * | 1/1986 | Klefbeck | 248/97 |
| 5,270,540 A | * | 12/1993 | Skop et al. | 250/239 |
| 5,371,537 A | * | 12/1994 | Bohan et al. | 348/181 |
| 5,940,350 A | * | 8/1999 | Booty, Jr. | 368/276 |
| 6,067,166 A | * | 5/2000 | Fox et al. | 356/402 |
| D432,516 S | * | 10/2000 | Chen | D14/170 |
| 6,163,377 A | * | 12/2000 | Boles et al. | 356/402 |
| 6,296,426 B1 | * | 10/2001 | King et al. | 408/76 |

* cited by examiner

*Primary Examiner*—Hoa Q. Pham
(74) *Attorney, Agent, or Firm*—Kin-Wah Tong, Esq.; Patterson & Sheridan, L.L.P.

(57) ABSTRACT

A symmetric monitor calibrator for mounting on a cathode ray tube or monitor with a surface. The calibrator has a case that holds electronic and optic components. Suction cups hold the calibrator to the surface, in which the suction cups are attached to the end of supporting elements that surround the case. At least three supporting elements with a common connecting point to form one support structure are connected to the top of the case. The supporting elements extend out creating a greater diameter than the case. The supporting elements and therefore suction cups uniformly surround the center point of the case to prevent rotation caused by the effects of gravity.

7 Claims, 7 Drawing Sheets

MONITOR CALIBRATOR

CROSS REFERENCE TO RELATED APPLICATIONS

The present application is a Continuation of and claims the benefit of U.S. application Ser. No. 10/023,621 filed Dec. 18, 2001, which claims the benefit of Provisional Application No. 60/256,552 filed Dec. 18, 2000, the disclosures of which are incorporated by reference herein in their entireties.

FIELD OF THE INVENTION

The present invention is directed to a monitor calibrator.

BACKGROUND

Prior art is represented by other monitor calibrators that lack stability when attached to the glass surface of a cathode ray tube (CRT) commonly used for computer monitors. The lack of stability is due to the way the device is attached to the monitor, and the cantilever effect that gravity has on the device once mounted.

One example cited is the Xrite DPT 92. The Xrite device uses a single large suction cup that is mounted on the device to attach to the glass surface of the monitor. Since the single large suction cup is offset from the true center of gravity of the device, the device and others designed similarly will have a tendency to droop or rotate downward due to the effect of gravity. This drooping action causes the light detector and related optics to rotate out of the plane of the CRT or monitor. Once the device rotates out of the plane of the monitor, the device may result in poor performance or unwanted error.

Another type of monitor calibrator known as the sequel device attempts to overcome the problem of drooping by attaching multiple suction cups on the mounting side of the device. In this case, the suction cups adhere to the monitor to try and improve stability, however, there is also some degree of droop or rotation. In the case of this design, the multiple suction cups are mounted to one side of the device, but the suction cups are still offset to the true center of gravity of the device, causing droop or rotation error. In addition to droop or rotation, this approach also results in adding a level of non-repeatability in measurement.

SUMMARY OF THE INVENTION

One embodiment of the invention is a monitor calibrator for mounting to a surface in order to reduce the effects of gravity on the calibrator. The calibrator has a case having a shape with a plurality of case supporting elements extending from the case uniformly distributed around a perimeter of the case.

DETAILED DESCRIPTION OF THE INVENTION

Figure 1:
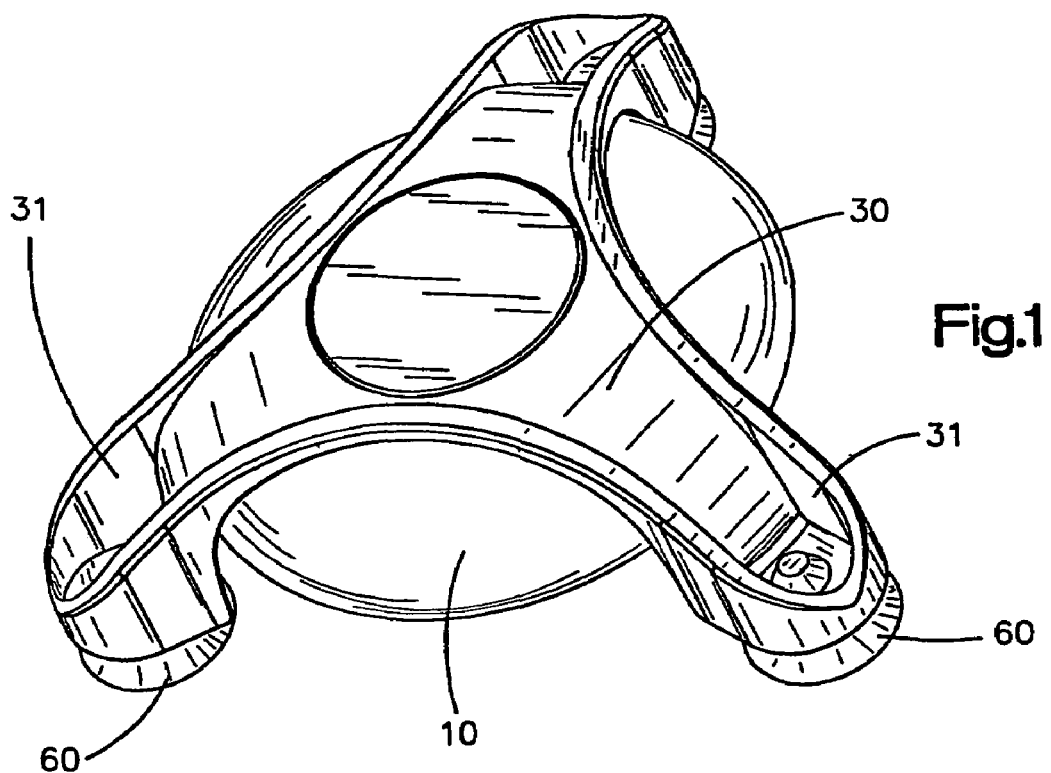
FIG. 1 is a perspective view of one embodiment of the present invention.
Figure 2:
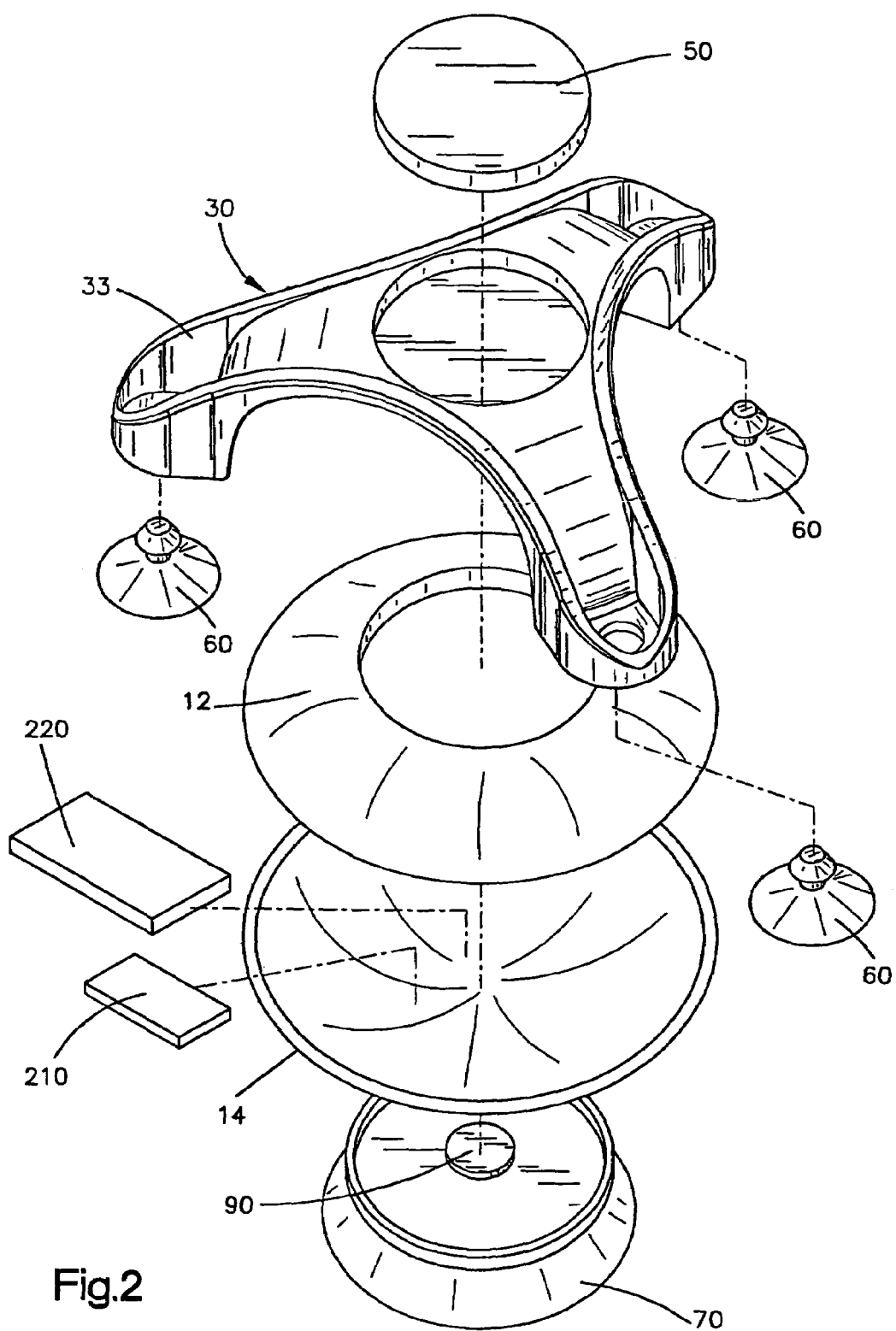
FIG. 2 is an exploded view of one embodiment of the present invention.
Figure 3:
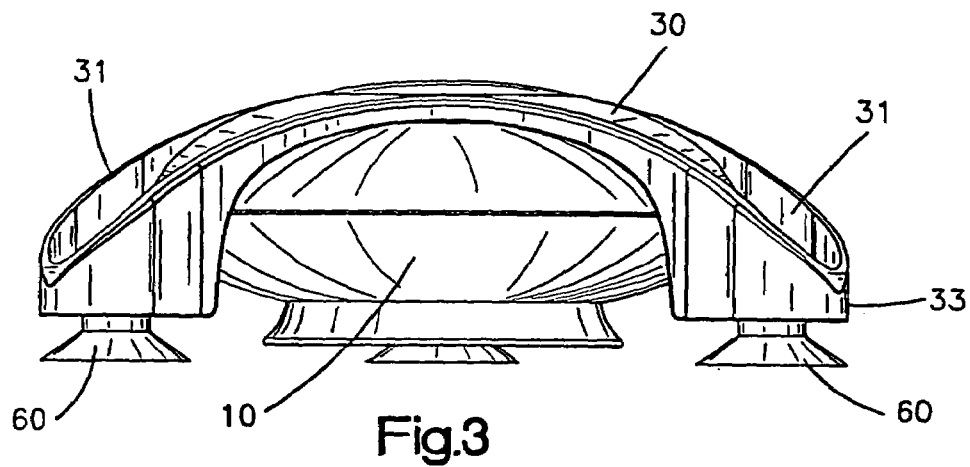
FIGS. 3–5 are side views of one embodiment of the present invention.
Figure 4:
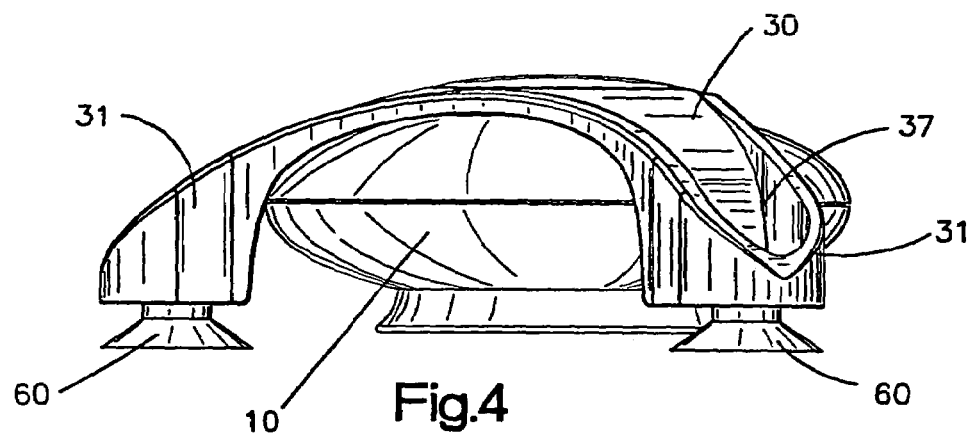
Figure 5:
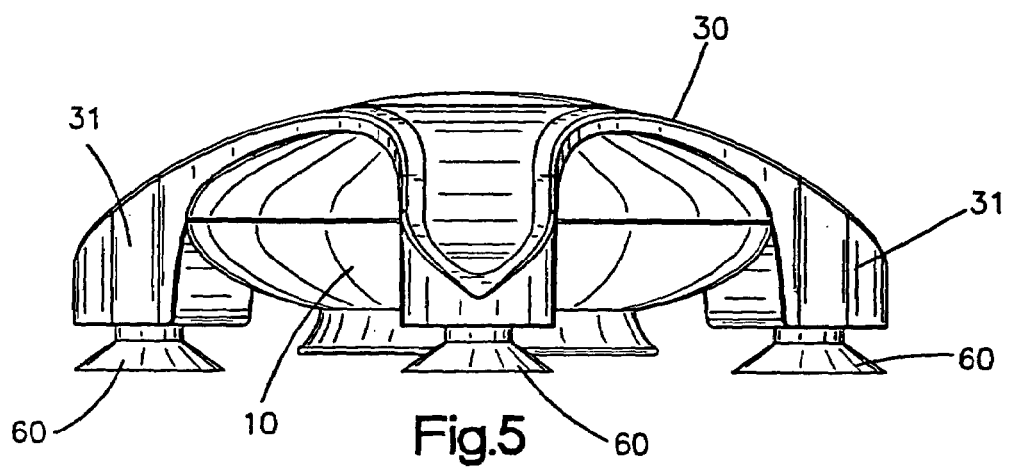
Figure 6:
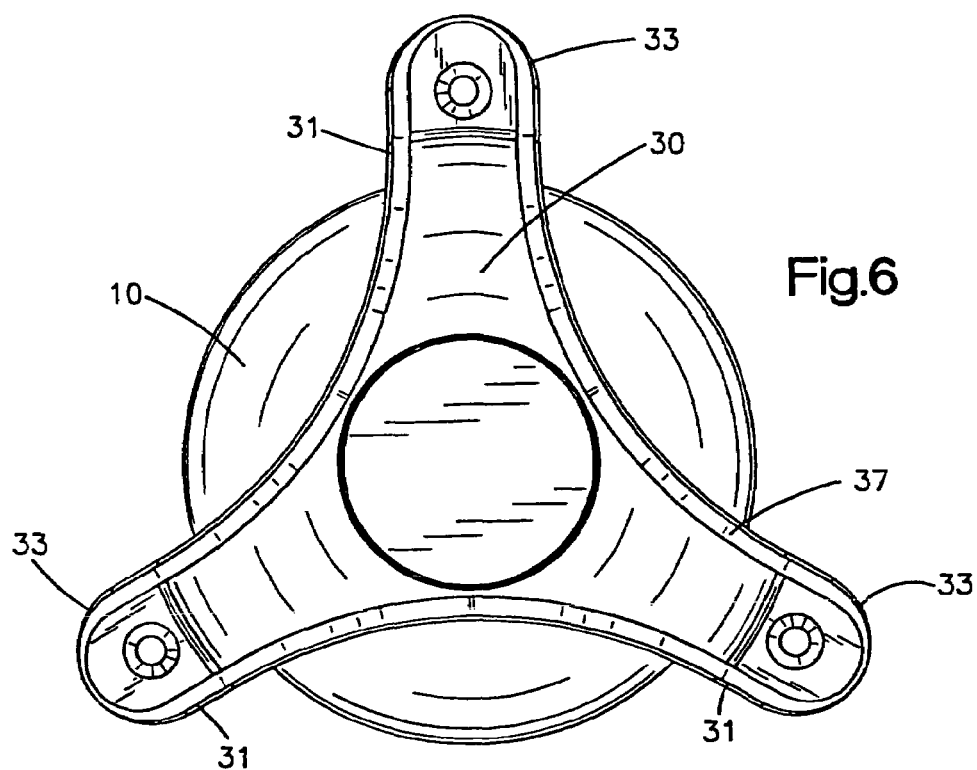
FIG. 6 is a top view of one embodiment of the present invention.
Figure 7:
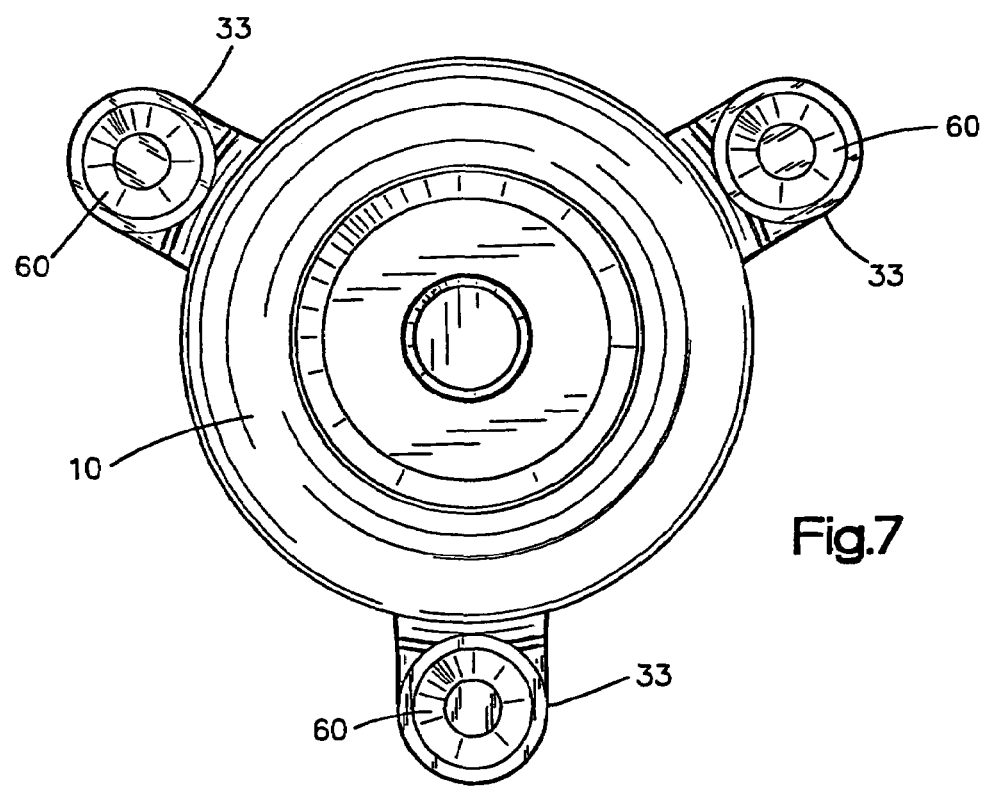
FIG. 7 is a bottom view of one embodiment of the present invention.

The invention will be described in reference to the drawings. FIG. 1 shows one embodiment of a monitor calibrator assembled and ready for use. FIG. 2 shows the exemplary structural elements of one embodiment of the monitor calibrator. Elements of the monitor calibrator 1 are a case 10 and a support structure 30.

Figure 8A:
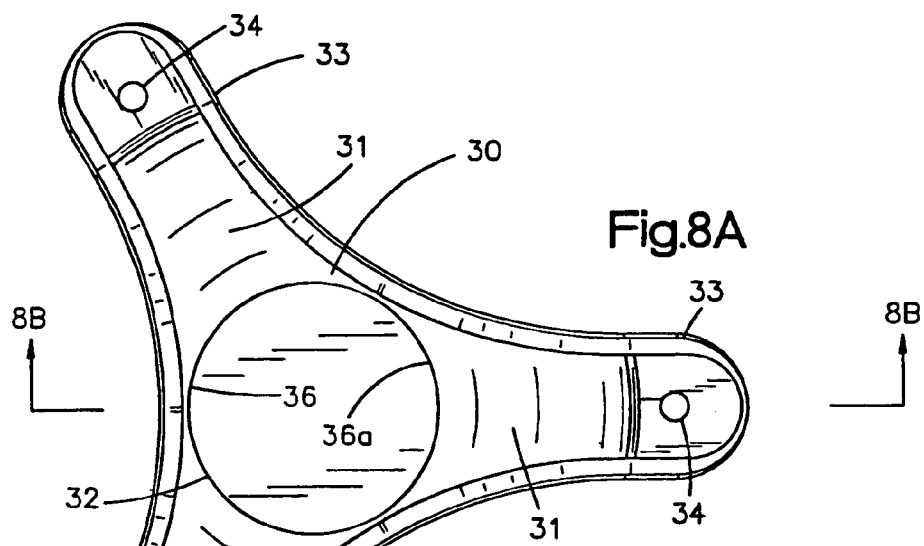
FIGS. 8A–C are top, sectional, and bottom views of one embodiment of the case supporting elements of the present invention.
Figure 8B:
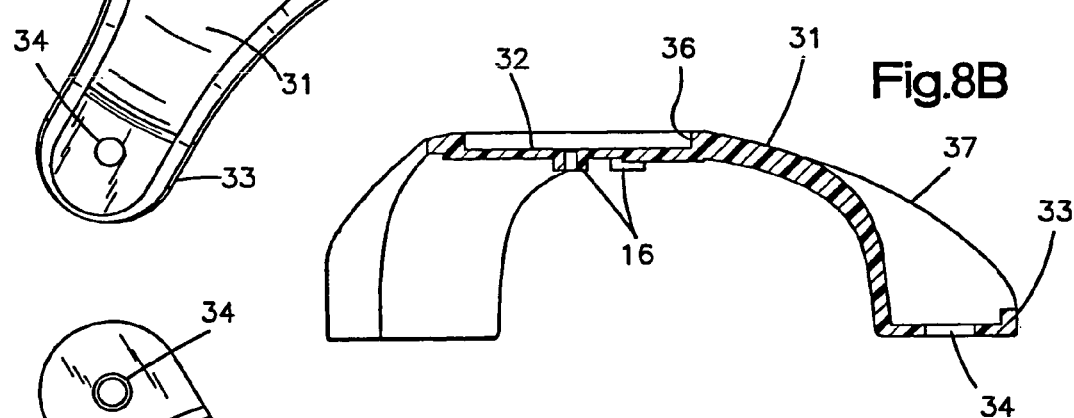
Figure 8C:
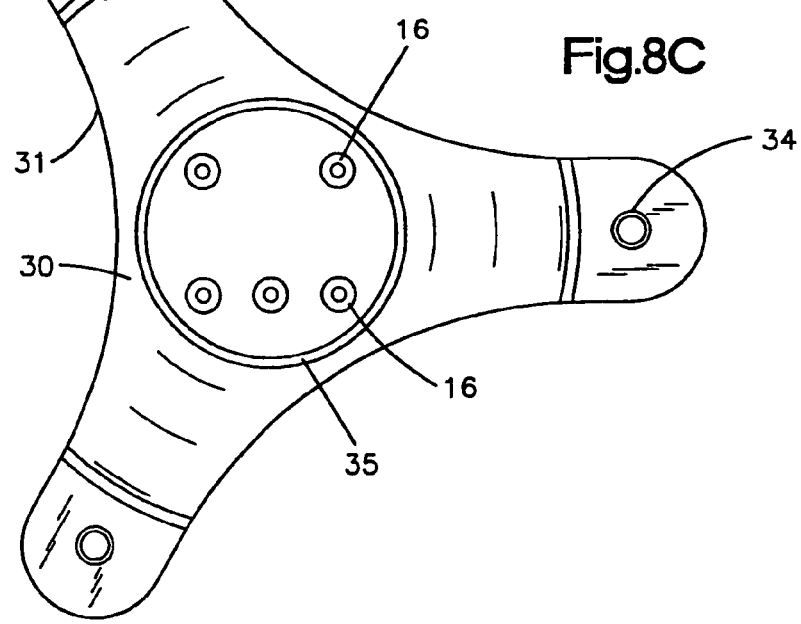
Figure 10:
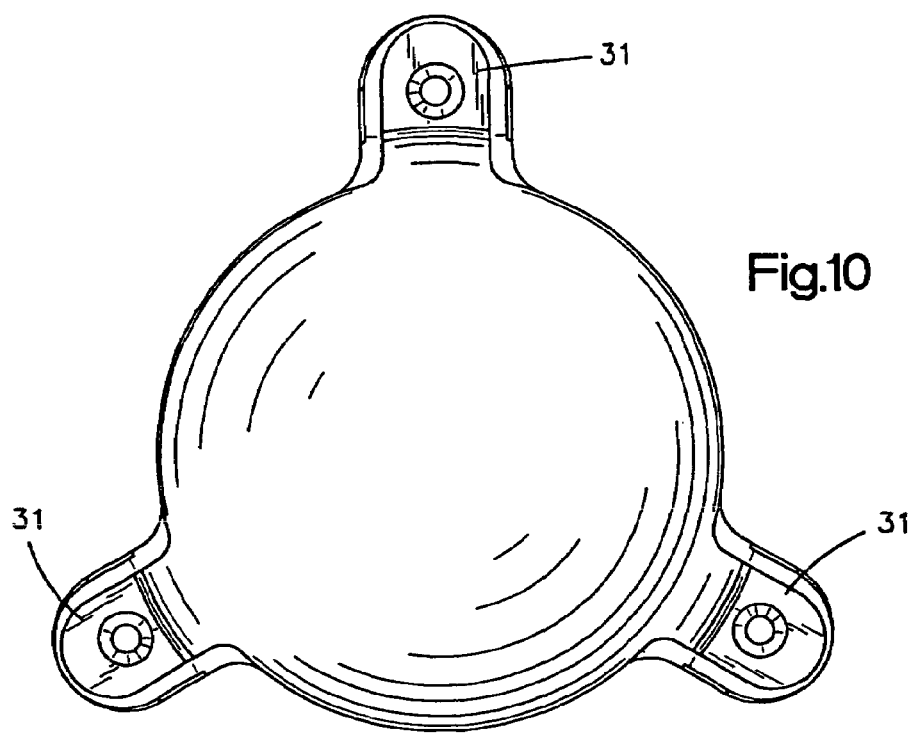
FIGS. 10 and 11 are top views of different embodiments of the present invention.
Figure 11:
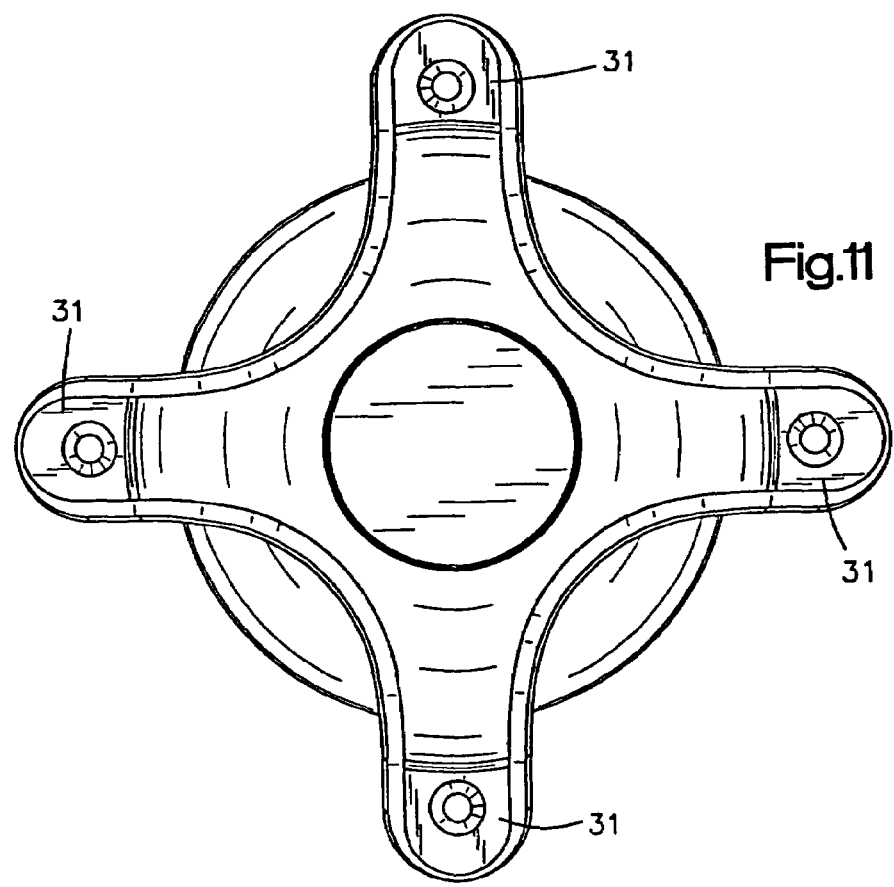

As shown in FIGS. 8A–C, the stability and support of the calibrator is created by the support structure 30 that has case supporting elements 31. One embodiment of the monitor calibrator 1 shows the support structure 30 with three case supporting elements 31. However, FIG. 11 shows another embodiment of the calibrator 1 with four case supporting elements 31. The case supporting elements 31 are symmetric with each other and protrude from the center of the support structure 30, which is the same center as the case 10. The protruding supporting elements 31 form a larger diameter than the case 10. One embodiment of the support structure 30 shows the support structure 30 to be a separate piece from the case 10, as shown in FIGS. 3–7. Another embodiment of the support structure is shown as an integral part of the case 10 in FIG. 10. Each case supporting element 31 cross section is formed as a plastic injected "C" channel 37, shown in FIG. 4 and FIG. 8B, so that it forms a stiff spring like structure.

The three case supporting elements 31 form a single triangular structure where each case supporting element 31 is equal distance to one another. This triangular shape provides stability to the support structure 30 since the case supporting elements 31 surround the center of the structure 30 and the case 10.

The top of the support structure 30 may have a cavity 32 surrounding the center of the support structure 30. The underneath 35 of the cavity 32 contains a fastening means, such as multiple female fasteners 16. On the top of the top half 12 of the case 10 there are fastening means, such as male fasteners 15, shown in FIG. 9A. The fasteners are primarily for securing the support structure 30 to the case 10. In addition, the cavity 32 contains a fastening means, such as the side walls 36 and 36a of the cavity 32, for securing a cap 50 with a logo of the product to the support structure 30.

Figure 9A:
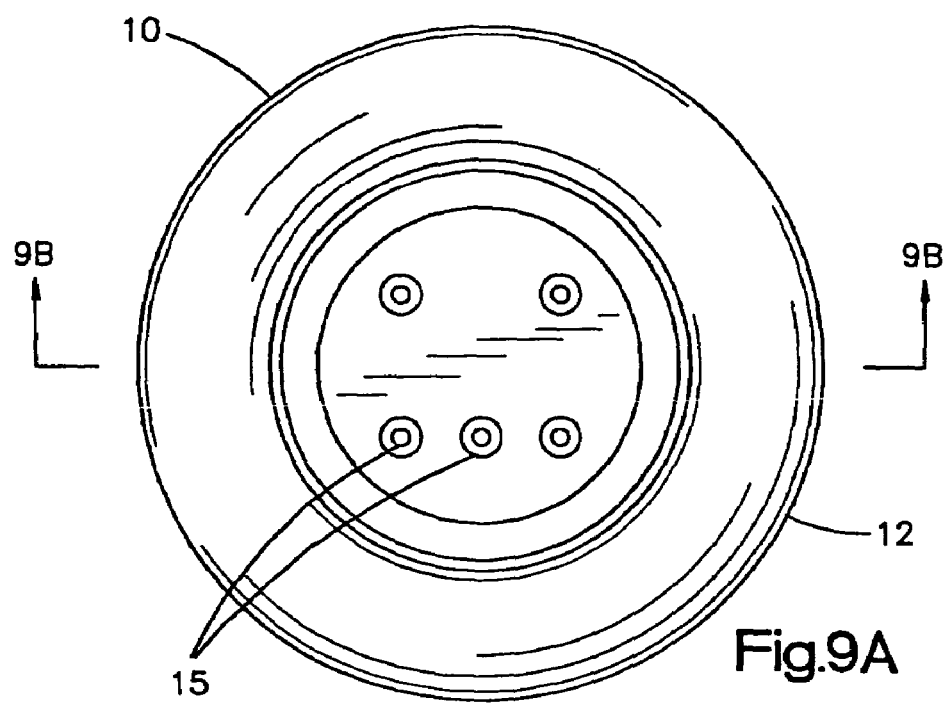
FIGS. 9A–C are top, sectional, and side views of one embodiment the part of the case of the present invention.
Figure 9B:
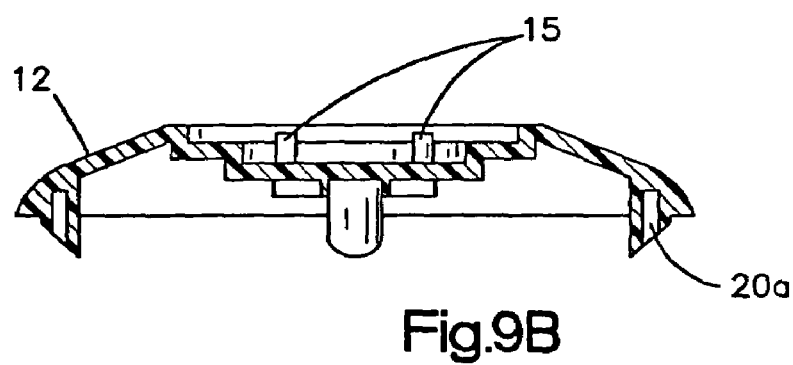
Figure 9C:
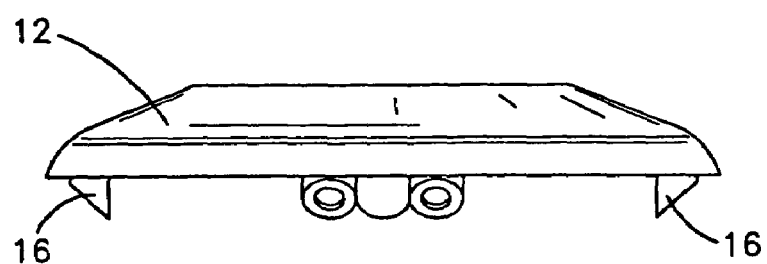

As shown in FIG. 2, one embodiment of the housing component of the invention, referred to as the case 10, is designed as a symmetric two piece puck with a top half 12, shown in FIGS. 9A–C, and a bottom half 14, shown in FIG. 2. The two halves resemble hemispheres that join together by fastening means, such as male and female components and a ridge and groove combination 20a. The two halves are hollow inside to store electronic and optic components, 210 and 220, respectively, of the invention. Reference is made to U.S. Pat. No. 6,163,377, incorporated by reference herein, issued on Dec. 19, 2000 and assigned to the present assignee, describing exemplary electronics and optics.

As shown in FIG. 2, suction cups 60 are preferably used as a supporting means to mount the calibrator 1 to a surface. Each case supporting element 31 has an aperture 34 through a foot 33 of the case supporting element 31 to hold the suction cup 60.

As shown in FIG. 2, a light shield 70 is an optional feature to attach to the bottom of the calibrator 1. On the top of the shield 70 is a fastening means for attachment with the case 10 in combination with the fastening means on the bottom of the case 10. The light shield's 70 main purpose is to prevent any unnecessary outside light which would cause the calibrator to misread a value.

As shown FIG. 2, a diffuser 90 may be secured to the bottom of the case by fastening means, such as semi-spherical locking fasteners, that correspond with fastening means, such as semi-spherical grooves, at the bottom of the case.

After the device 1 is completely assembled, the device 1 is able to be mounted on a monitor. Once attached to the monitor or CRT, the case, supporting elements 31 compress the suction cups 60 against the surface. This compression pre-loads the case supporting elements 31. The energy caused by this pre-loading technique results in enough force that it minimizes the droop or roll experienced by other designs.

Although the present invention has been described in detail with reference to certain preferred embodiments thereof, other embodiments are possible. Therefore, the spirit and scope of the appended claims should not be limited to the description of the preferred embodiment contained herein.

What is claimed is:

1. A calibrator for mounting to a monitor surface, the calibrator comprising:
    a case;
    an electronic component for measuring a color content of light emitted from the monitor surface secured to an inner surface of the case; and
    a support structure, secured to an outer surface of the case, including a plurality of case supporting elements extending over and radially outwardly from the case and uniformly distributed around a perimeter of the case, such that gravitational effects on the calibrator are reduced when the case supporting elements are secured to the monitor surface.

2. The calibrator of claim 1, wherein the case supporting elements are secured to the monitor surface by a supporting means.

3. The calibrator of claim 2, wherein the monitor surface is substantially vertical.

4. The calibrator of claim 2, wherein the supporting means for mounting the calibrator to the monitor surface is compressed by the impingement of the case supporting elements against the monitor surface.

5. The calibrator of claim 4, wherein the compression of the supporting means pre-loads the support structure.

6. The calibrator of claim 2, wherein the pre-loading of the support structure results in a force that substantially stabilizes the calibrator relative to the monitor surface.

7. The calibrator of claim 2, wherein the supporting means comprises:
    suction cups for securing the case supporting elements to the monitor surface.

* * * * *